United States Patent [19]

Ervin et al.

[11] 4,076,787

[45] Feb. 28, 1978

[54] UNIVERSAL BATTERY CASE HAVING EMBOSSED INTERCELL PARTITIONS AND PROCESS FOR MAKING SAME

[75] Inventors: William W. Ervin, Sun City, Ariz.; Lee A. Fleck, Markleville, Ind.

[73] Assignee: General Motors Corporation, Detroit, Mich.

[21] Appl. No.: 718,464

[22] Filed: Aug. 30, 1976

[51] Int. Cl.² .......................... B29C 17/00; B29E 5/00
[52] U.S. Cl. .................................... 264/250; 264/296; 264/322
[58] Field of Search ............... 264/250, 293, 296, 322; 429/176, 186, 148, 149, 153, 159; 206/332-334, 449, 521

[56] References Cited

U.S. PATENT DOCUMENTS

| 3,607,440 | 9/1971 | Daniel ................................... 429/176 |
| 3,917,770 | 11/1975 | Jackson .................................. 264/296 |

FOREIGN PATENT DOCUMENTS 249,367  9/1967  Germany .............................. 429/176

OTHER PUBLICATIONS

Anon., "Transparent Battery Housing", Modern Plastics, Aug. 1943, p. 62.
Anon., Modern Plastics, Sept. 1955, p. 90.

Primary Examiner—Willard E. Hoag
Attorney, Agent, or Firm—Lawrence B. Plant

[57] ABSTRACT

A battery case is molded with substantially planar intercell partitions which are subsequently locally heated in selected areas and deformed thereat to form bosses for holding the battery's cell element packs away from the partition and substantially centrally of the battery cell. By merely adjusting the size of the bosses, a single, universal case can be adapted to hold a number of different sized cell element packs, and hence is adaptable to be used with a variety of energy capacity batteries.

2 Claims, 10 Drawing Figures

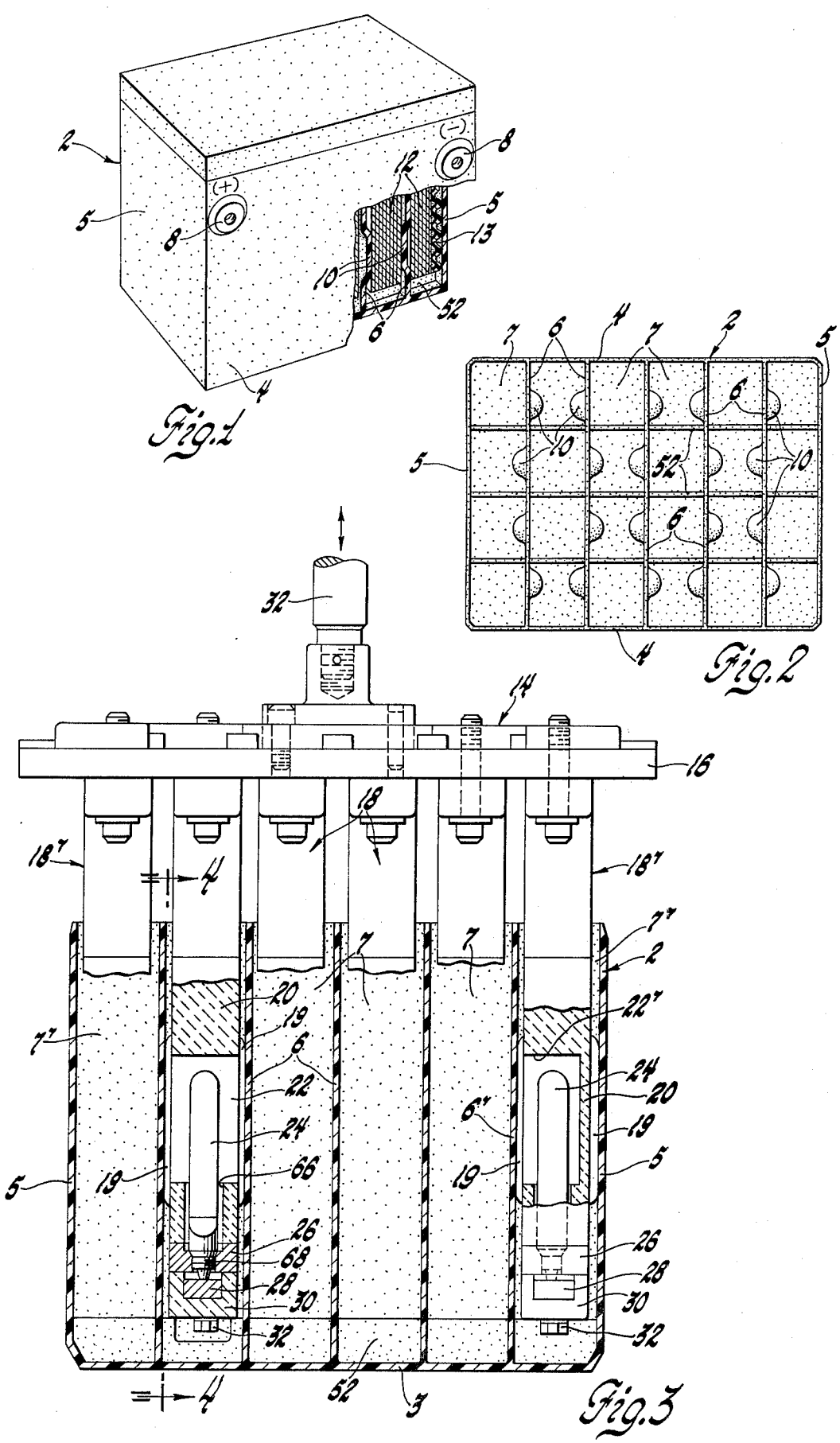

UNIVERSAL BATTERY CASE HAVING EMBOSSED INTERCELL PARTITIONS AND PROCESS FOR MAKING SAME

BACKGROUND OF THE INVENTION

This invention relates to the packaging or containerization of electrical storage battery element packs and more particularly to the packaging of a variety of different sized packs in a single universal case which is readily adaptable for use with a variety of energy density batteries.

Battery manufacturers have traditionally provided different energy capacity batteries in a single case size by varying the size of the electrochemical element pack placed in each cell (i.e., the number of positive and negative plates per pack). Low energy batteries usually contain about nine plates per pack while high energy batteries usually contain about fifteen plates per pack. The cell element packs are spaced from the partitions and held substantially centrally of the cell compartment by ribs molded onto the partitions when the case is molded. Larger ribs are used for the smaller packs and conversely smaller ribs for the larger packs. This has traditionally necessitated the need to purchase and inventory a number of expensive case molds, not to mention the time and effort required to change over from one mold to the next. Some manufacturers inventory a lesser number of molds, and vary the size (i.e., thickness) of the cell element pack by incorporating electrochemically inert spacers therein (e.g., extra separators, corrugated plastic sheet, etc.) This technique adds the cost of the spacer and frequently complicates the in-plant handling of the cell element pack, particularly during its insertion into the case.

Accordingly, it is an object of this invention to obviate the foregoing by molding a single universal case and thereafter modifying the partitions thereof to adapt that case to accept a full range of cell pack sizes. More specifically, it is an object of this invention to emboss different sized cell pack spacers onto substantially planar lateral walls of the cell compartments of a universal case. These and other objects and advantages of the invention will become more apparent from the detailed description which follows.

BRIEF DESCRIPTION OF THE INVENTION

This invention comprehends: molding a universal, battery case having a plurality of individual cell compartments bounded in part by substantially planar (i.e., ribless) lateral walls (i.e., intercell partitions or case end walls); locally heating selected portions of the planar walls to a softening, thermoformable temperature; and thereafter deforming the softened portions to emboss the planar partitions with bosses for spacing the cell element packs from the partitions. The molding and heating steps of the process are the same for all energy density batteries, and a minor change in embossing tools readily changes the size of the spacer bosses to accommodate the full range of cell element packs.

DESCRIPTION OF THE DRAWINGS

FIG. 1 is a partially cut-away, perspective view of a battery made in accordance with this invention; FIG. 2 illustrates, in top plan view, one arrangement of bosses made according to this invention;

FIG. 3 is a partially sectioned, side elevational view through a battery case and a tool for locally heating of the lateral walls of the cell compartments;

DETAILED DESCRIPTION OF THE INVENTION

Figure 4:
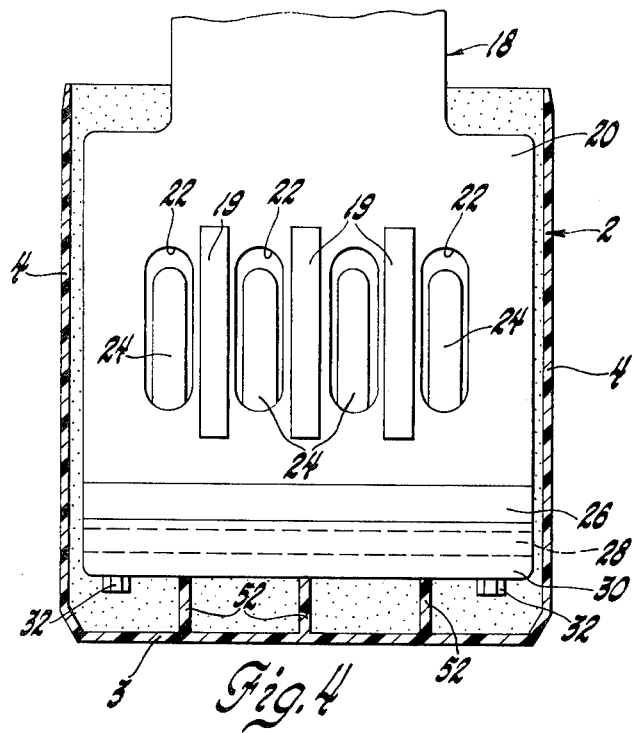
FIG. 4 is a sectioned, front elevational view taken in the direction 4—4 of FIG. 3.

FIGS. 1 and 2 illustrate a multicell battery comprising a covered case 2 having a bottom 3, side walls 4, end walls 5 and partitions 6. Individual cell compartments 7 contain the separate cells of the battery and are defined in part by lateral walls 5 and 6. Cell element packs 12 comprise the electrochemically active ingredients of the battery, and include positive plates, negative plates and inter-plate separators which prevent shorting between the respective positive and negative plates. The cell element packs 12 are serially joined to the packs in the next adjacent compartment(s) and to the output terminals 8 of the battery, as is well known in the art. The cell element packs 12 are held substantially centrally of the compartment 7 by bosses 10 formed on the partitions 6 and the end walls 5 (if desired). In the alternative, and for appearance sake, an inert spacer (e.g., corrugated plastic 13) may be used adjacent the end walls 5. In the case of a Pb-acid battery, the cell element packs 12 may rest on bridges 52 formed adjacent the bottom 3, as is well known in the art.

Bosses 10 in accordance with this invention are generally convexly shaped (e.g., symmetrical or elongated) projections extending out from the main portion of the lateral walls 5 or 6 of the compartment 7, and are formed by heating selected portions of the lateral walls into the plastic range followed by deforming the softened portion into the compartment with an appropriate embossing means. The extent to which the bosses 10 project beyond the lateral walls 5-6, will depend upon the thickness (i.e., number of plates) of the cell element packs 12 destined for use with the particular battery under construction. For thin cell packs 12 (e.g., nine plates/pack), larger bosses 10 are provided, and for thicker cell packs 12 (e.g., 15 plates/pack), smaller bosses 10 are provided. As will be pointed out hereinafter, the extent to which the bosses 10 project beyond the lateral walls is readily changed by a simple substitution of embossing tools at the embossing station. The precise location, arrangement or pattern of the bosses 10 on the lateral walls 5-6 is not particularly significant so long as the combination of shape, number and distribution is adequate to secure the packs 12 substantially centrally of the compartments 7. FIGS. 2, 5, 6 and 7 merely illustrate examples of acceptable shapes and arrangements.

FIG. 3 depicts an as molded battery case 2 positioned within one embodiment of a heater assembly 14 at the heating station of the process. As shown, the lateral walls 5–6 are substantially planar and define compartments 7 which ultimately receive cell packs 12. At the heating station, a heater assembly 14 locally heats portions of the lateral walls (here, partitions 6 only) to their softening temperature. The particular heating assembly 14 shown in FIGS. 3 and 4 comprises a plurality (i.e., one per cell compartment) of heating elements 18 mounted on a common carrier plate 16. The elements 18 are lowered, or alternatively the case 2 raised, to position the elements 18 in the compartments 7 adjacent the lateral walls 5–6. A rod 32 positions, or lifts, the assembly 14 as appropriate. The frame 20 of the heating element 18 comprises a low thermally conductive material (e.g., ceramic) and, though smaller dimensionally, substantially conforms shapewise to the shape of the compartment 7 so that it can readily be inserted therein. Guides 19 are provided on the faces of the frame 20 for centering the frame in the compartments 7 and serve to some extent in localizing the heat to be generated. Quartz lamps 24 or other appropriate heat generators (e.g., resistance coils, etc.) are inserted into openings 22 in the frame 20 through bores 66 in the bottom of the frame 20. The screw base contacts 68 for the quartz lamp 24 engage conductive electrical bus bars 26 and 28 to derive this energy. The lamps 24 and bus bars 26-28 are held in place by a retaining channel 30 bolted (i.e., 32) to the frame 20. The heating elements 18' in the end cell compartments 7' (i.e., cells 1 and 6 for a 12 volt Pb-acid battery) may be the same as the heating elements 18 for the inner cell compartments if the end walls 5 are also to be embossed, but, as illustrated in FIG. 3, the opening 22' in the heater elements 18' opens only to the intercell partition 6' so that the end wall 5 is not heated (i.e., see FIG. 1 for corrugated spacer 13 in end cell for exterior aesthetics).

At the heating station, heat from the lamps 24 is applied to areas of the partitions adjacent the openings 22 in the frame 20 and continued for a sufficient time to raise the temperature thereat to a thermoforming temperature — that is to say a temperature at which it is readily deformable/embossable, and upon cooling following deformation will retain the deformed shape (e.g., about 270° F. for typical unfilled ethylene-propylene copolymers used in Pb-acid automobile batteries). Other forms of heaters may also be employed such as resistance heated contact pads or hot air heaters as will be discussed later in conjunction with FIGS. 8 and 10.

Figure 5:
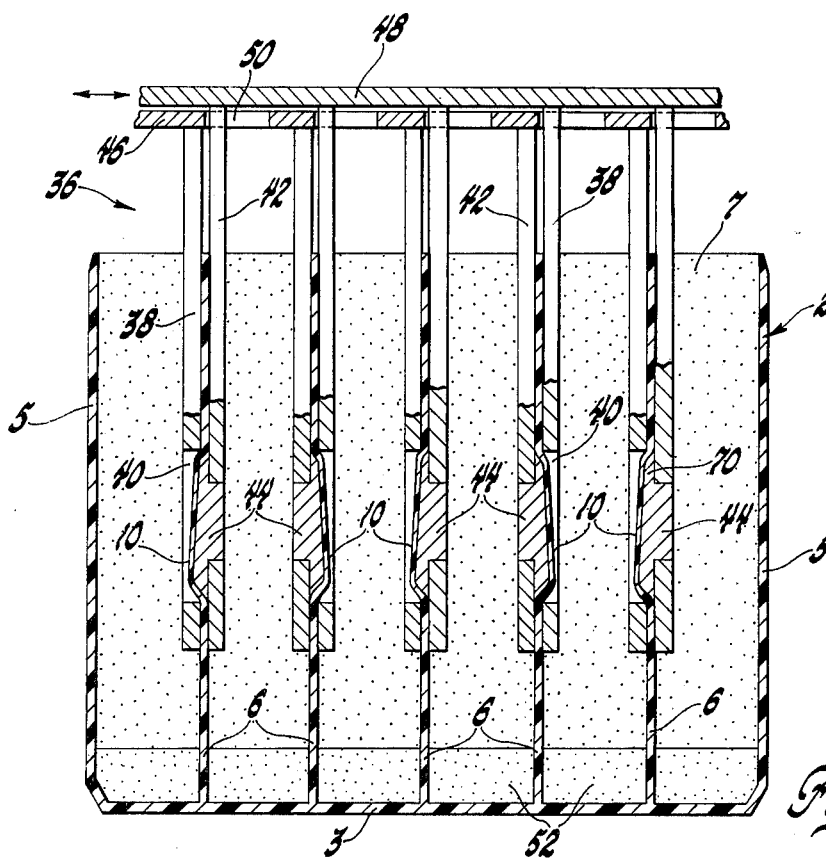
FIG. 5 is a partially sectioned, side elevational view of a battery case and embossing tool.
Figures 8, 9:
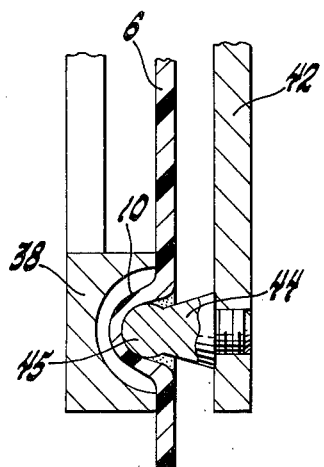
FIG. 8 is a partially sectioned, side elevational view illustrating the heating of a partition in accordance with another embodiment of the present invention.
FIG. 9 is a partially sectioned, side elevational view illustrating the embossing of a partition in accordance with another embodiment of the present invention.
Figure 10:
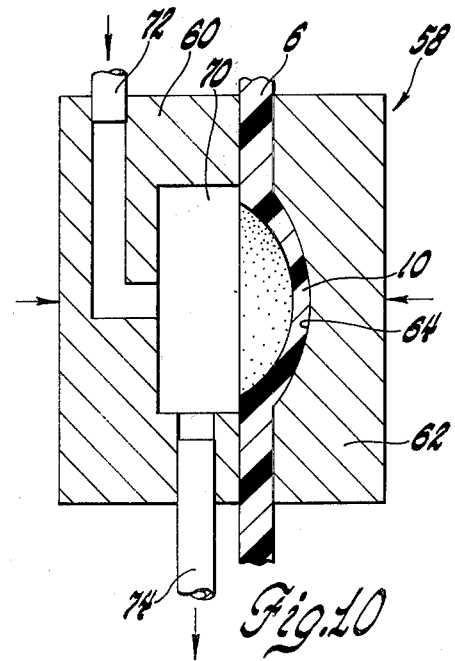
FIG. 10 is a partially sectioned, side elevational view illustrating the heating and embossing of a partition in accordance with still another embodiment of the present invention.

Following heating, the heating elements 18 are removed from the compartments 7 and while selected portions of the lateral walls are still soft the case is quickly transferred to an embossing station such as is illustrated in FIG. 5. FIG. 5 illustrates an embosser 36 comprising a stationary die or mold carrying plate 38 and a ram or punch carrying drive plate 42 moveable to and from the plate 38. The embosser 36 is shown in the closed position acting on partitions to form the bosses 10. An opening 40 in the die plate 38 receives the boss 10 formed by the ram of anvil 44. In the case illustrated the shape of the boss is determined by the shape of the ram or anvil 44, but the die plate 38 might alternatively carry a boss shaping mold as, for example, is illustrated in FIGS. 9 and 10. The die plate 38 may conveniently be rigidly affixed to a plate 46 held stationary by appropriate supporting structure (not shown) at the embossing station. Similarly, the drive plate 42 for the ram or anvil 44 may be rigidly affixed to the plate 48 which is slideably moveable relative to the stationary plate 46 and such that the drive plates 42 are moved back and forth in slots 50 cut out of the stationary plate 46. The gap between the plates 38 and 42 receives the partitions 6 and, when open, is sufficiently wide to accommodate the elevation of the boss 10, the elevation of the ram or anvil 44 and the thickness (i.e., preferably less than about 0.100 inches) of the partition 6 so that after embossing the case 2 can readily be stripped from the embosser 36. At the beginning of the embossing cycle, the partitions 6 are positioned in the gap between the plates 38 and 42. As plate 42 moves to the left the rams/anvils 44 engage the partition 6 and shift the case 2 to the left until the partitions 6 engage the plate 38 and comes to rest. The ram/anvil 44, however, continues to move leftwardly and in so doing deforms the softened portion of the partition 6 into the die opening 40 thereby forming the boss 10. After sufficient cooling to fix the shape of the boss 10, the plates 42 are moved to the right, the case 2 removed from the tooling and the embosser 36 is ready to receive the next case.

In the particular embodiment shown in FIG. 5, the boss 10 is generally convex, but elongated in the vertical direction thereby permitting the use of fewer but larger bosses 10. Elongated bosses such as shown in FIG. 5 are preferably sloped somewhat to provide a camming surface for easier insertion of the cell element packs 12 into the compartments.

Battery cases made according to the foregoing method can readily be adapted to accommodate different sized cell packs 12 as the situation dictates. In this regard, the elevation of the boss 10 beyond the planar extent of the partition 6 depends solely on the elevation of the ram or anvil 44 which requires but a few minutes to change over to a different size. Hence, batteries destined for nine plate cell packs are embossed using rams/anvils 44 having larger portions 70 projecting beyond the faces of the plates 42 than batteries destined for use with fifteen plate cell packs 12.

Figure 6:
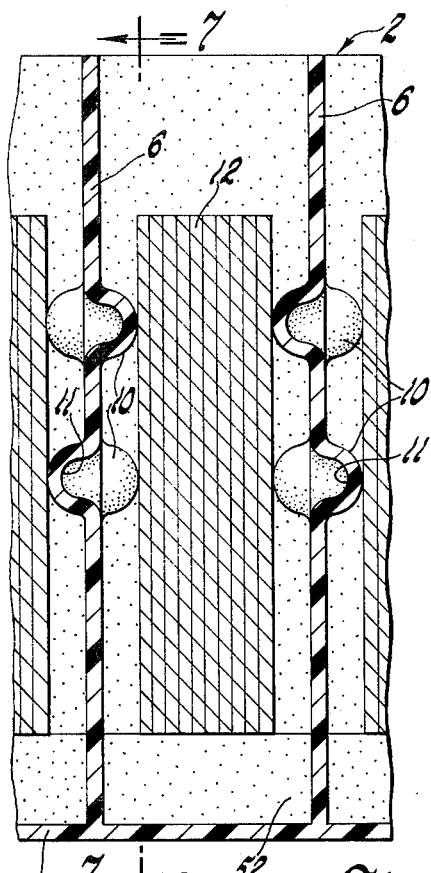
FIG. 6 is a sectioned, side elevational view of a portion of a battery case illustrating another embodiment of the bosses of the present invention.
Figure 7:
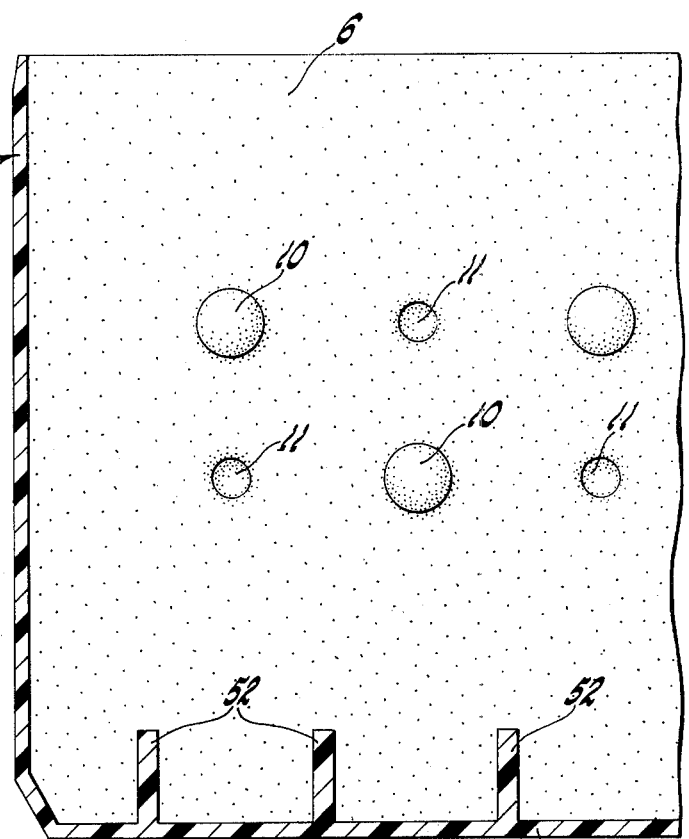
FIG. 7 is a sectioned, front elevational view of the partition of FIG. 6 taken in the direction 7—7 thereof.

Many variations of the foregoing are possible within the spirit of the invention. Hence not only can the size, shape and distribution of the bosses vary significantly, but so too the plates 38 and 42 could be reversed in terms of which are stationary and which are moveable or each plate might carry both dies/molds and rams/anvils. By way of example of such variations, FIGS. 6 and 7 illustrate another embodiment of the invention in which the bosses 10 comprise symmetrical convexly shaped bosses on one side of a partition 6 and correspondingly shaped dimples 11. The bosses 10 and dimples 11 are alternately arranged across the face of the partitions 6.

FIG. 8 illustrates another technique for locally heating the partition in which electrically heated pads 54 are applied to the portions of the partition 6 to be heated by tong arms 56. Similarly, FIG. 9 illustrates another embodiment of an embosser in which the ram or anvil 44 has a spherical head 45 and pushes the plastic from partition 6 into a mold 38. The embosser shown in FIG. 9 is particularly useful in forming the dimpled boss design shown in FIGS. 6 and 7.

FIG. 10 illustrates still another embodiment of the process aspects of the invention. In this embodiment the heating and deforming operations are performed at the same station and with the same tool. More specifically, the heating and embossing tool 58 comprises a mold portion 62 and an air-ram portion 60. The two portions 60 and 62 are pressed tightly against the partition 6, and hot gases (e.g., air) are passed through the cavity 70 via inlet and outlet conduits 72 and 74 respectively. When the portion of the partition 6 adjacent the cavity 70 reaches its thermoforming temperature, conduit 74 is closed, as by appropriate valve means (not shown), and pressure is built up in the cavity 70 until it is sufficient to effectively blow mold the boss 10 into the cavity 64 of the mold portion 62. Thereafter, cooling air may be passed through the cavity 70 to accelerate cooling.

In one specific example of the present invention, bosses 10 were made according to the process depicted in FIG. 10. A 0.075 inch thick partition 6 comprising an ethylene-propylene copolymer was heated with low pressure, 900° F. air flowing through cavity 70 to soften the plastic. After approximately 8 seconds, the exhaust conduit 74 was closed, the hot air turned off and room temperature air at about 90 lbs. per square inch was introduced into the inlet conduit 72 to deform the softened portion 10 of the partition 6 into the cavity 64. At its thinnest point nearest the outermost portion of the boss the thickness of the material was reduced to about 0.035 inches.

In another example of the invention formed in accordance with the process illustrated in FIGS. 8 and 9, a selected circular area (i.e., 1.5 inch² diameter) of the partition 6 was heated for about 30 seconds with pads 54 heated to about 300° F. Bosses, like FIGS. 6 and 7, were then formed with embossers like in FIG. 9 such that the bosses 10 stood approximately 0.300 inch in relief from the major planar extent of the partition 6.

While we have disclosed our invention primarily in terms of specific embodiments thereof, we do not intend to be limited thereto except to the extent hereinafter set forth.

What is claimed is:

1. A process for making a multicell, thermoplastic, storage battery case having a plurality of individual compartments for containing the battery's electrochemically active cell elements, said process comprising the steps of: molding a case with substantially planar intercell partitions dividing said case into said compartments; softening localized portions of said partitions; and pushing said portions into said compartments so as to produce a plurality of bosses on said partitions for spacing said elements from said partitions and substantially centrally of said compartments.

2. A process for making a multicell, thermoplastic, storage battery case having a plurality of individual compartments for containing the battery's electrochemically active cell elements, said compartments being in part defined by lateral partition walls having spacing means projecting therefrom a predetermined distance into said cell compartments for engaging and positioning said elements substantially centrally of said compartments, said process comprising the steps of: forming a case of thermoplastic material with substantially planar compartment-defining lateral partition walls; heating selected poritons of said walls to soften said thermoplastic material; and deforming said heated portions into said compartments said predetermined distance to form said spacing means.

* * * * *